United States Patent Office 3,294,453
Patented Dec. 27, 1966

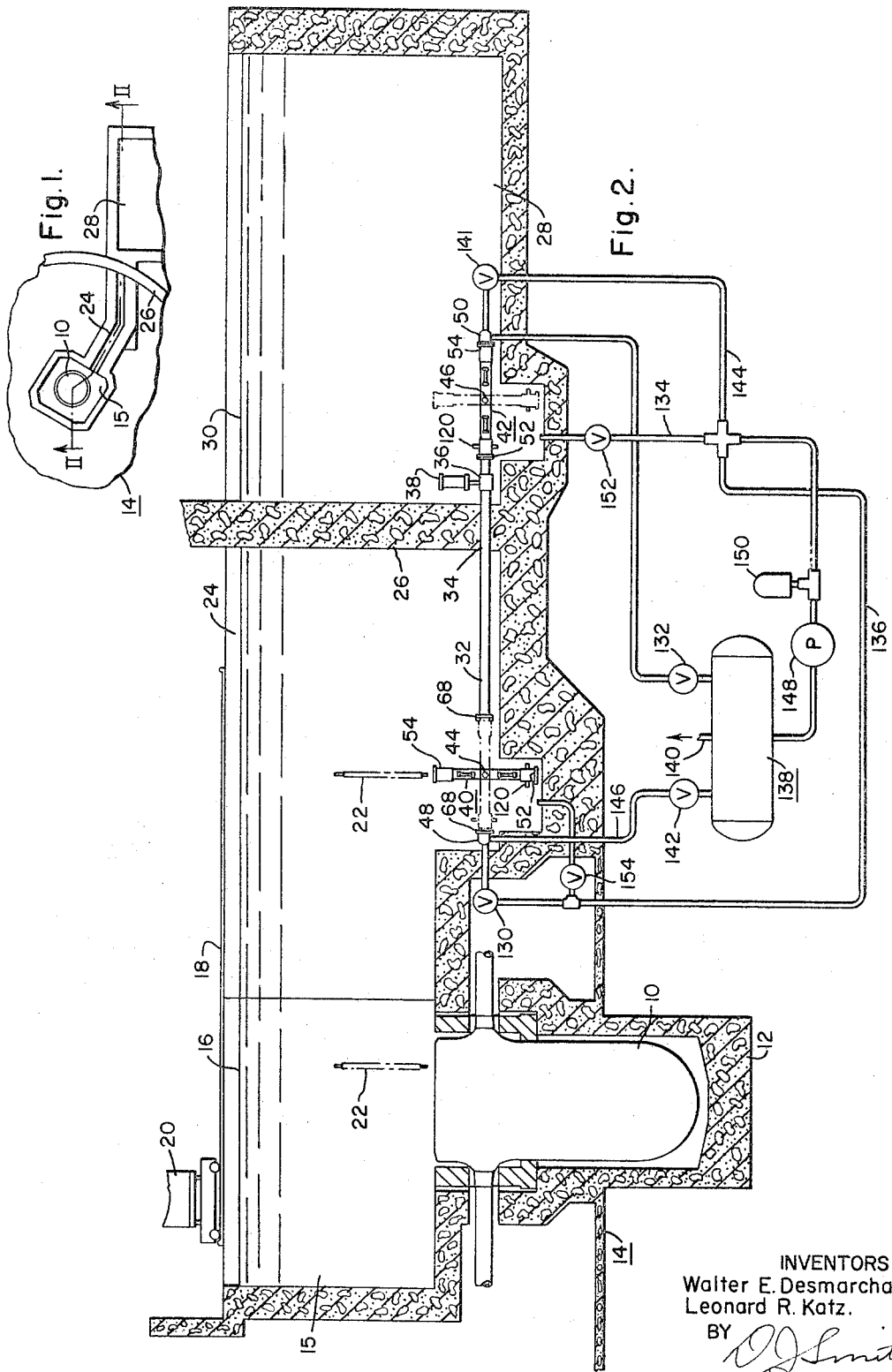

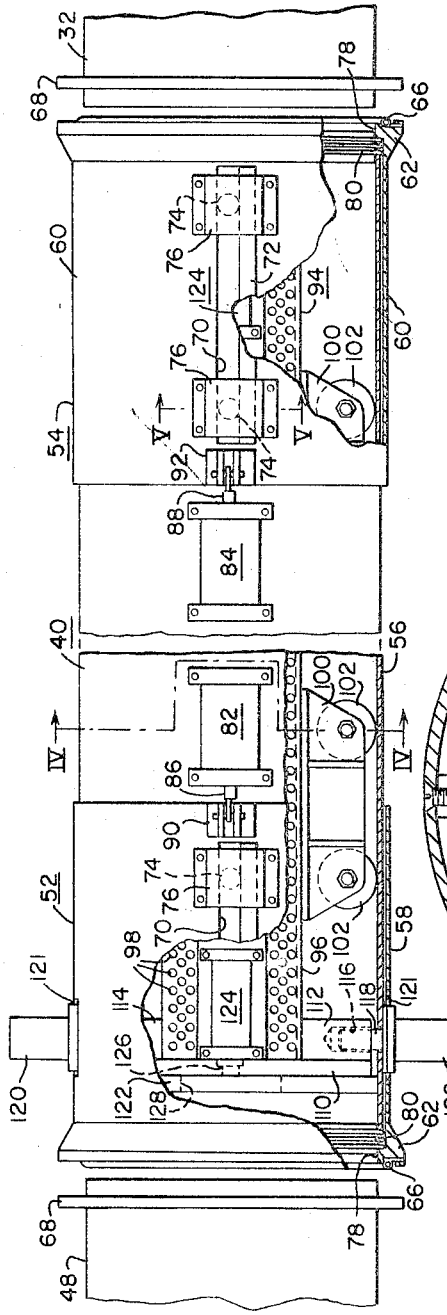
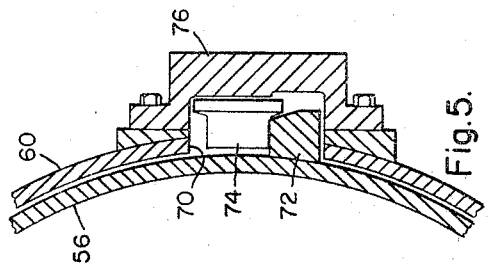
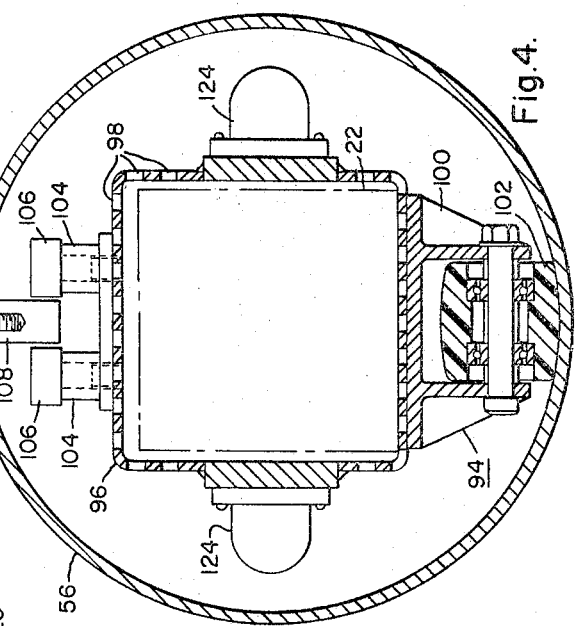

3,294,453
APPARATUS FOR HANDLING AND TRANSPORTING COMPONENTS
Walter E. Desmarchais and Leonard R. Katz, Pittsburgh, Pa., assignors to Westinghouse Electric Corporation, East Pittsburgh, Pa., a corporation of Pennsylvania
Filed Mar. 6, 1964, Ser. No. 349,871
15 Claims. (Cl. 302—2)

This invention relates to apparatus for the handling and transferring of components from one location to another, and more particularly to apparatus for efficiently and safely transferring reactor components, such as spent fuel assemblies from the plant enclosure of a nuclear power reactor to an external spent fuel pit for storage prior to shipment for reprocessing.

In the operation of neutronic reactors, it is common to provide adjacent to the reactor enclosure a large container or spent fuel pit containing water and sunk into the earth for the handling and storage of spent fuel assemblies which are, of course, highly radioactive. In the refueling of a neutronic reactor of this type, spent fuel assemblies are transferred from the plant enclosure to the external spent fuel pit for storage prior to shipment for reprocessing. This transfer is accomplished under water to protect the operators from the effects of radiation.

A system heretofore used to transfer spent fuel assemblies to the spent fuel pit utilizes a transfer tank, which is a tank structure extending through the wall of the plant enclosure. Fuel assemblies and control rods are placed into the tank in a vertical position through a valve in the refueling canal side, and thereafter shuttled through the transfer tank to the spent fuel pit on a chain drive mechanism. Since, however, fuel assemblies become very long in large plants, the vertical transfer means heretofore used becomes impractical because of the transfer tank height requirement.

Accordingly, as an overall object, the present invention seeks to provide new and improved apparatus for transferring reactor components, such as spent fuel assemblies, between the plant enclosure of a neutronic reactor and an external spent fuel pit, which apparatus eliminates the need for a large transfer tank extending through the plant enclosure wall.

More specifically, an object of the invention is to provide apparatus for transferring spent fuel assemblies from a neutronic reactor to an external spent fuel pit in which the spent fuel assemblies are conveyed in a horizontal position, from the plant enclosure to the spent fuel pit through a horizontal transfer tube of relatively small cross-sectional area, thereby making it possible to transfer spent fuel assemblies of any desired length without the necessity for a large and cumbersome transfer tank.

Another object of the invention is to provide apparatus for transferring components between two locations by utilizing a static head of fluid.

Still another object of the invention is to provide apparatus of the type described in which spent fuel assemblies are conveyed hydraulically between the plant enclosure and the spent fuel pit utilizing the existing static head of water in the plant enclosure or spent fuel pit as the motivating force for transfer.

In accordance with the invention, the plant enclosure and spent fuel pit are interconnected by means of a horizontally-extending transfer tube containing a gate valve which is normally closed to isolate the borated water in the enclosure from the nonborated water, such as demineralized water, in the pit. At either end of the transfer tube, in the plant enclosure and spent fuel pit respectively, are cylindrical tilting devices rotatable about generally horizontal axes from horizontal positions where they are aligned with opposite ends of the transfer tube to generally vertical positions where a fuel assembly or control rod may be inserted therein, or removed therefrom. In operation, the cylindrical element in the plant enclosure is initially rotated to a vertical position and a spent fuel assembly deposited therein. Thereafter, the tilting device and fuel assembly are rotated into alignment with the transfer tube, the gate valve opened, and the spent fuel assembly hydraulically transferred through the transfer tube to the cylindrical tilting device in the spent fuel pit. Finally, this latter-mentioned cylindrical device is rotated into a vertical position where the fuel assembly may be elevated out of the second cylindrical device and deposited in the spent fuel pit, all of these operations being carried out beneath the surface of a protective liquid such as water. A reverse procedure can be utilized to transfer a component from the spent fuel pit to the plant enclosure.

Preferably, the system includes a carriage movable on rollers or the like within the transfer tube and reciprocable between the aforesaid cylindrical tilting devices at either end thereof. When the carriage is in the cylindrical device within the plant enclosure, it is rotated into a vertical position where it receives the spent fuel assembly, and thereafter rotated into a horizontal position and hydraulically sealed to a substantial degree to the transfer tube. The cylindrical device in the spent fuel pit is also rotated into alignment with the transfer tube and hydraulically sealed thereto. Thereafter, a hydraulic force, such as a static head of water, is utilized to move the carriage, which carries the spent fuel assembly, from the plant enclosure through the transfer tube to the cylindrical device in the spent fuel pit where it is thereafter rotated into a vertical position and removed for storage.

The above and other objects and features of the invention will become apparent from the following detailed description taken in connection with the accompanying drawings which form a part of this specification, and in which:

FIGURE 1 is a simplified plan view of a nuclear reactor installation with which the present invention may be used;

FIG. 2 is a cross-sectional view of the nuclear reactor of FIG. 1, taken substantially along line II—II and showing the plant enclosure, refueling canal, and spent fuel pit associated therewith;

FIG. 3 is a partially broken-away cross-sectional view of the carriage utilized in accordance with the invention for transferring spent fuel assemblies from the plant enclosure to the spent fuel storage pit;

FIG. 4 is a cross-sectional view taken substantially along line IV—IV of FIG. 3; and FIG. 5 is a partial cross-sectional view taken along line V—V of FIG. 3 illustrating the manner in which the hydraulic seal elements of the invention are moved between sealing and retracted positions.

Referring now to the drawings, and particularly to

FIGS. 1 and 2, the numeral 10 designates generally a nuclear reactor which is carried within a concrete housing 12. The housing 12 forms part of a dome shaped concrete enclosure 14 which includes a basin 15 above the reactor 10. During refueling of the reactor 10, the basin 15 is filled with water up to the level, generally indicated at 16. However, during normal operation of the reactor, the liquid is drained from the basin 15. At the top of the basin 15 are tracks 18 which carry, for reciprocating movement, a manipulator crane 20. The purpose of the manipulator crane 20 is to remove or insert reactor components, such as fuel assemblies or control rods, into the reactor 10, one of such fuel components being schematically illustrated at 22.

Communicating with the basin 15 is a refueling canal or compartment 24 of concrete which terminates at the wall 26 of the concrete dome-shaped enclosure 14 for the entire nuclear reactor installation. The basin 15 and canal 24 are lined with stainless steel plates, not shown herein for purposes of simplicity.

Outside the dome-shaped enclosure 26 is a spent fuel pit or compartment 28, also constructed with concrete walls and filled with water up to the level indicated at 30. As was explained above, it is necessary in the refueling of a nuclear reactor to transfer spent fuel assemblies and control rods from the plant enclosure 14 to the spent fuel pit 28 while maintaining each spent fuel assembly beneath the level of the protective water baths. The system of the invention for accomplishing this purpose includes a transfer tube 32, which is preferably of Type 304 stainless steel and having, in one illustrative embodiment, a diameter in the range of about twenty inches. The tube 32 runs horizontally through the plant enclosure wall 26 and is welded to the stainless steel liner thereof, not shown, as at 34.

Within the transfer tube 32, in the spent fuel pit 28, is a gate valve 36 which is normally closed but may be opened by means of a hydraulic cylinder 38. As will be understood, the gate valve 36 is utilized for the purpose of normally isolating the borated water within the enclosure 14 from the demineralized water in the spent fuel pit 28. Two tilting devices 40 and 42 are provided in the refueling canal 24 and spent fuel pit 28, respectively, with the tilting device 40 being rotatable about a generally horizontal axis 44 from the vertical full line position shown to a horizontal position shown in dotted outline where it is aligned with the transfer tube 32. In a similar manner, the tilting device 42 is rotatable about a generally horizontal axis 46 between the horizontal position shown in full lines where it is also aligned with the transfer tube 32 at the other end thereof, to the vertical position shown in dotted outline. Any suitable means may be utilized for rotating the tilting devices 40 and 42, such mechanisms being within the skill of the art and, therefore, not shown herein in detail.

Aligned with the transfer tube 32 at opposite ends thereof are short pipe sections 48 and 50 in the refueling canal 24 and spent fuel pit 28, respectively. These short pipe sections are spaced from the ends of the transfer tube 32 by distances substantially equal to the lengths of the tilting devices 40 and 42. At either end of each of the tilting devices 40 and 42 are hydraulic seals 52 and 54 which are, for example, adapted to hydraulically seal tilting device 40 to the short pipe section 48 and left end of the transfer tube 32, as will hereinafter be explained in greater detail.

Briefly, the operation of the system is such that the tilting device 40 is first rotated to a vertical position and a reactor component 22, such as an irradiated or spent fuel assembly or control rod 22, is removed from the reactor 10 and carried by crane 20 to a position where it can be deposited in the tilting device 40. Carried within the tilting device 40 is a roller-mounted carriage, hereinafter described in detail, which receives the reactor component. Thereafter, the tilting device 40 is rotated into its horizontal position where it is aligned with the transfer tube 32 and short pipe section 48. In a similar manner, the tilting device 42 is also rotated into a horizontal position where it is in alignment with the transfer tube 32 and short pipe section 50. Following this procedure, the sealing devices 52 and 54 on each tilting device 40 and 42 are actuated to seal substantially the tilting devices to the transfer tube 32 and short pipe sections 48 and 50, respectively. Gate valve 36 is then opened by means of the hydraulic cylinder 38 to provide an unobstructed path through the transfer tube 32.

In order to move the carriage which receives the spent fuel assembly or control rod from the tilting device 40 to tilting device 42, water under pressure is forced through the short pipe section 48, thereby causing the carriage to travel from left to right as viewed in FIG. 2 until it reaches the tilting device 42. Following this, the sealing devices 52 and 54 are disconnected from the short pipe section 50 and the transfer tube 32, respectively; the tilting device 42 is rotated into the vertical position shown in dotted outline; and the spent fuel assembly or control rod is removed from the carriage by means of an overhead crane, not shown. Finally, the tilting device 42 is rotated back into its horizontal position, the sealing devices 52 and 54 are actuated, and water under pressure forced into short pipe section 50 to force the carriage from right to left as viewed in FIG. 2 until it reaches the tilting device 40 preparatory to a succeeding transfer operation.

With reference now to FIG. 3, the tilting device 40, for example, is shown in detail and comprises a cylindrical casing 56 having two cylindrical sleeve elements 58 and 60 fitted over its outer periphery at either end thereof and forming part of the sealing devices 52 and 54. At the forward end of each of the sleeve elements 58 and 60 is a flanged portion 62 which carries an O-ring seal 66 adapted to engage a flange 68 on the short pipe section 48 or transfer tube 32 as the case may be.

As best shown in FIG. 5, each cylindrical sleeve element 58 or 60 is provided with openings 70 in its sides, which receive tracks 72 welded to the periphery of the tubular casing 56 and which project radially outwardly therefrom. Movable on the tracks 72 are rollers 74 carried on housings 76 which are, in turn, welded or otherwise securely fastened to the sleeves 58 and 60. In this manner, it can be seen that the sleeves 58 and 60 may move from their retracted positions shown in FIG. 3 to extended positions wherein the seals 66 abut the flanges 68 on short pipe section 48 and transfer tube 32, respectively. The inner periphery of the flange 62 as at 78 is such as to fit over the outer periphery of the short pipe section 48 or transfer tube 32, as the case may be; and a bellows arrangement 80 is provided as shown between the end of the tubular casing 56 and surface 78 to provide a liquid-tight seal.

In order to actuate the sleeve elements 58 and 60, two hydraulic cylinders 82 and 84 are provided on each opposite side of the tubular casing 56. The cylinders 82 and 84 are securely fastened to the outer periphery of the tubular casing 56 and have piston rods 86 and 88 connected to clevises 90 and 92 which are welded or otherwise securely fastened to the sleeve elements 58 and 60, respectively. In this maner, it will be appreciated that actuation of the cylinders 82 and 84 in one sense will cause the sleeve elements 58 and 60 to separate, thereby hydraulically sealing the ends of the assembly to the short pipe section 48 and transfer tube 32; whereas actuation of the cylinders 82 and 84 in the opposite sense will break the hydraulic seal and separate the tilting device 40 from the short pipe section 48 and transfer tube 32 such that it may be rotated about axis 44 into a vertical position.

Carried within the tubular casing 56, as best shown in FIGS. 3 and 4, is a carriage assembly 94 comprising an elongated rectangular receptacle or container 96 having perforations or holes 98 in all four sides. Extending downwardly from the bottom of the container 96 are brackets 100 which carry rollers 102, the rollers 102 being crowned as shown in FIG. 4 whereby they will ride on the lower inner peripheral surface of the tubular casing 56. At the top of the rectangular container 96 are brackets 104 (FIG. 4) which carry rollers 106 rotatable about vertical axes as shown. The rollers are arranged to engage opposite sides of a rail 108 which extends throughout the length of each tilting device 40 or 42 as well as the transfer tube 32.

It will be appreciated that in this manner the rollers 102 support the container 96 for longitudinal movement through the tilting devices and transfer tube; while the rail 108 in combination with rollers 106 laterally guide the carriage 94 along its path of travel.

Welded to the left end of the carriage assembly 94, as best shown in FIG. 3, is a flat plate 110. This plate carries two blocks 112 and 114 having bores 116 therein adapted to receive pneumatically actuated plungers 118, the cylinders 120 therefore being welded to the outer peripheral surface of the tubular casing 56 within slots 121. With the plungers 118 in bores 116, the plate 110 will abut an annular baffle plate 122 which is welded to the inner periphery of the tubular casing 56 at the left end thereof as viewed in FIG. 3. Hydraulic shock absorbers 124 are carried on either side of the carriage assembly 94, as best shown in FIG. 4, and are provided with plungers 126 (FIG. 3) which engage the plate 122 and cushion the impact of the carriage assembly against that plate. With the plates 110 and 122 in abutment, cylinders 120 are actuated to force the plungers 118 into bores 116 such that when the tilting device 40, for example, is rotated into a vertical position, the carriage assembly 94 will be held securely in place. The tilting device 40, for example, is always rotated such that the left end of the tubular casing 56 as viewed in FIG. 3 is at the bottom with the carriage assembly resting on the plate 122.

Extending through the plate 122 is a circular opening 128 which, however, has a smaller cross-sectional area than the fuel assembly inserted into the carriage assembly such that the fuel assembly will not pass therethrough when it is inserted into the tilting device in a vertical position, but rather will be retained by the plate 122. The opening 128 will, however, permit fluid under pressure to pass from the short pipe section 48, for example, into the interior of the tubular casing 56.

The tilting device 42 is similar to that shown in FIG. 3, except that the plate 122 will be at the right end of the tubular casing 56 rather than the left end as viewed in FIG. 3. As mentioned above, the carriage assembly 94 is provided with hydraulic shock absorbers 124 at its right end for engaging the plate 122 in tilting device 42. However, a plate 110 is provided only on one end of the carriage assembly as shown.

Reverting again to FIG. 2, the operation of the system is as follows, it being understood that suitable electrical and hydraulic controls can be provided within the skill of the art for effecting the operation either automatically, semi-automatically, or manually. Initially, it will be assumed that the carriage assembly 94 is within the tilting device 40; that the cyinders 120 are actuated to force plungers 118 into bores 116; and that all valves shown are closed except valve 152. Assuming, further, that the tilting device 40 is in a horizontal position in alignment with the transfer tube 32, it will then be rotated about axis 44 by any suitable means in a counterclockwise direction whereby the plate 122 and cylinders 120 will be at the bottom of the assembly in its vertical position. The right end of the rectangular container 96 of carriage assembly 94 as viewed in FIG. 3 is now at the top of the tilting device 40 preparatory to receiving a spent fuel assembly.

After the tilting device 40 is thus positioned, a spent fuel assembly 22 is removed from the reactor 10 by means of the manipulator crane 20 and placed into the rectangular container or receptacle 96 of carriage assembly 94 which, of course, is now within the tilting device 40 in a vertical position. Following this step, the tilting device is rotated about axis 44 in a clockwise direction until it is aligned with the transfer tube 32 and short pipe section 48. Normally, the tilting device 42 in the spent fuel pit 28 will be aligned with the transfer tube 32 and short pipe section 50 at this time.

Assuming that both tilting devices 40 and 42 are now aligned with the transfer tube 32, the hydraulic cylinders 82 and 84 on each tilting device are actuated to force the tubular sleeves 58 and 60 outwardly and into engagement with flanges 68 on opposite ends of the transfer tube 32 and the short pipe sections 48 and 50, as the case may be. Following this, the hydraulic cylinder 38 is actuated to open the gate valve 36; and in this manner an uninterrupted sealed conduit is provided between the short pipe sections 48 and 50.

Following the sealing operation and the opening of gate valve 36, the cylinders 120 are actuated to remove the plungers 118 from bores 116, thereby releasing the carriage assembly 94 for movement through the transfer tube 32. At the same time, valves 130 and 132 shown in FIG. 2 are opened. This permits water from the spent fuel pit 28, under the force of the static pressure head therein, to flow through valve 152 which is already open, conduits 134, 136 and the valve 130 into short pipe section 48 where it flows through opening 128 in plate 122 (FIG. 3) to act against the left face of plate 110 on the carriage assembly 94. In this manner, it can be seen that the force of the water due to the static pressure head in the spent fuel pit 28 will cause the carriage assembly 94 to move on rollers 102 from left to right as viewed in FIG. 2 until it reaches the tilting device 42 in the spent fuel pit 28 where it abuts against the plate 122 for that tilting device. As the carriage assembly 94 moves from left to right through the transfer tube 32, as viewed in the drawing, the water to the right of the carriage assembly flows through valve 132 into a storage tank 138 which is vented to the atmosphere as at 140. In other words, the water in the transfer tube is simply dumped into the storage tank 138.

When the carriage assembly 94 is within the tilting device 42, valves 130 and 132 are closed and the cylinders 120 on the tilting device 42 are actuated to force their plungers 118 into the bores 116 on the carriage assembly. This locks the carriage assembly to the tilting device so that it will not roll out of the tilting device when it is rotated into a vertical position. Assuming that the carriage assembly is thus positioned within the tilting device 42, the hydraulic cylinders 82 and 84 on this tilting device are actuated to withdraw the tubular sleeve elements 58 and 60, thereby breaking its hydraulic seals with the transfer tube 32 and short pipe section 50. At this point, the tilting device 42 is rotated in a counterclockwise direction about axis 46 into a vertical position where the spent fuel assembly is removed and placed in the spent fuel pit 28 by an overhead crane, not shown.

Following the removal of the spent fuel assembly, the tilting device 42 is rotated in a clockwise direction until it is again aligned with the transfer tube 32 and short pipe section 50; whereupon the hydraulic cylinders 82 and 84 are actuated to seal the tilting device to the transfer tube 32 and short pipe section 50, and the cylinders 120 actuated to withdraw the plungers 118 on tilting device 42 from the bores 116 in the carriage assembly 94. At this point, the valves 141 and 142 are opened, while valve 152 remains open so that water will flow under the static pressure head in the spent fuel pit 28 through conduits 134, 144 and the valve 141 into the short pipe section 50, thereby acting against the right face of the plate 110 on carriage assembly 94 and forcing it from right to left as viewed in FIG. 2. During this time, water flows through conduit 146 and valve 142 into the storage tank 138. When the carriage assembly 94 abuts against the plate 122 in the tilting device 40, the cylinders 120 on the device 40 are actuated to lock the carriage in position; the valves 141 and 142 are closed; cylinder 38 is actuated to close the gate valve 36, and the apparatus is ready to repeat another cycle.

It is also obvious that the procedure described above can also be used to transport a component from the spent fuel pit 28 to the refueling canal 24. The component by means of crane 20 can then be removed from tilting device 40, taken from the refueling canal 24 to the basin 15, and inserted into reactor 10.

From time-to-time, the water dumped into the storage tank 138 may be forced by means of a pump 148 and accumulator assembly 150 back into the spent fuel pit 28. In this process, it will be appreciated that some of the borated water from the plant enclosure 14 will be mixed with that from the spent fuel pit 28 and pumped into the spent fuel pit. Although it is desirable to minimize this as much as possible, the amount of mixing does not present a particularly serious problem. It will be appreciated, of course, that as this process continues, the shielding liquid within the plant enclosure 14 will be progressively depleted and must be replenished from time-to-time.

Instead of using the static pressure head of water in the spent fuel pit 28 for purposes of motivating the carriage assembly 94, the valve 152 may be closed and valve 154 opened; whereupon the static pressure head in the enclosure 14 may be used for this purpose. Under these conditions, the operation is the same as that described above.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In apparatus for handling and storing components, a compartment capable of holding a liquid, another compartment also capable of holding a liquid, substantially horizontally-extending open tube means for connecting said compartments beneath the surfaces of the liquids when contained therein, the means operable under the force of the static pressure head of the liquid when so contained in one of said compartments and exposed substantially to atmospheric pressure for hydraulically forcing a component in said one compartment through the tube means to said other compartment.

2. In apparatus for handling and storing components, a compartment capable of holding a liquid, another compartment also capable of holding a liquid, substantially horizontally-extending open tube means for connecting said compartments to each other beneath the surfaces and under a substantial height of the liquids when contained therein, and means operable under the force of the static pressure head of the liquid when so contained in one of said compartments for hydraulically forcing a component in said one compartment through the tube means to said other compartment.

3. In apparatus for handling and storing neutronic reactor components, a plant enclosure capable of holding liquid, an external fuel pit also capable of holding a liquid, horizontally-extending tube means for connecting the plant enclosure and fuel pit beneath the surfaces of the liquids when contained therein, means for aligning an elongated reactor component in said enclosure with the tube means, and means operable under the force of the static pressure head of a liquid for hydraulically forcing an aligned reactor component through the tube means to the fuel pit, said pressure head being applied at one end of said component while simultaneously venting the space adjacent the other end of said component to the atmosphere.

4. In apparatus for handling and storing components, a compartment capable of holding a liquid, another compartment also capable of holding a liquid, substantially horizontally-extending tube means for connecting said compartments beneath the surfaces of the liquids when contained therein, a carriage capable of reciprocating movement within the tube means between said compartments, receptacle means on the carriage for receiving a component when the carriage is in one of said compartments, and means operable under the force of a static pressure head for hydraulically forcing the carriage having a component received within its receptacle means from said one compartment and through the tube means to said other compartment where the component may be removed from said receptacle means, said static pressure head being developed by the liquid when so contained in one of said compartments.

5. In apparatus for handling and storing radioactive neutronic reactor components, a plant enclosure capable of holding a shielding liquid, an external spent fuel pit also capable of holding a shielding liquid, tube means for connecting the spent fuel pit and plant enclosure at the lower portions thereof, a cylindrical element in the plant enclosure beneath the surface of said shielding liquid when contained therein and rotatable about a generally horizontal axis from a vertical position where it may receive a reactor component to a horizontal position where it is aligned with said tube means, and means operable under the force of a static pressure head of one of said liquids when so contained therein for hydraulically forcing a reactor component deposited in said cylindrical element and rotated into alignment with the tube means through said tube means to the spent fuel pit for storage.

6. In apparatus for handling and storing radioactive neutronic reactor components, a plant enclosure capable of holding a shielding liquid, an external spent fuel pit also capable of holding a shielding liquid, tube means for connecting the spent fuel pit and plant enclosure at the lower portions thereof, a first cylindrical element in the plant enclosure beneath the surface of said shielding liquid when contained therein and rotatable about a generally horizontal axis from a vertical position where it may receive a reactor component to a horizontal position where it is aligned with said tube means, a second cylindrical element in the spent fuel pit beneath said shielding liquid when contained therein and rotatable about a generally horizontal axis from a vertical position where a reactor component may be removed therefrom to a horizontal position where it is also aligned with said tube means, and means operable under the force of the static pressure head of a shielding liquid when so contained therein for hydraulically forcing a reactor component deposited in the first cylindrical element through the tube means to the second cylindrical element in the spent fuel pit where it may be rotated into a vertical position and removed.

7. In apparatus for handling and storing radioactive neutronic reactor components, a plant enclosure capable of holding a shielding liquid, an external spent fuel pit also capable of holding a shielding liquid, tube means for connecting the spent fuel pit and plant enclosure at the lower portions thereof, gate valve means in the tube means normally closed to isolate the plant enclosure from the spent fuel pit, a first cylindrical element in the plant enclosure beneath the surface of said shielding liquid when contained therein and rotatable about a generally horizontal axis from a vertical position where it may receive a reactor component to a horizontal position where it is aligned with said tube means, a second cylindrical element in the spent fuel pit beneath the shielding liquid when contained therein also rotatable about a generally horizontal axis from a vertical position where a reactor component may be removed therefrom to a horizontal position where it is aligned with said tube means, means for selectively opening said gate valve means, and means operable under the force of the static pressure head of one of said shielding liquids when so contained therein after the gate valve means is opened for hydraulically forcing a spent fuel element deposited in the first cylindrical element through the tube means to the second cylindrical element in the spent fuel pit where it may be rotated into a vertical position and removed.

8. In apparatus for handling and storing neutronic reactor components, a plant enclosure capable of holding a shielding liquid, an external fuel pit also capable of holding a shielding liquid, tube means for connecting the fuel pit and plant enclosure at the lower portions thereof, a cylindrical element in the plant enclosure beneath the surface of said shielding liquid when contained therein and rotatable about a generally horizontal axis from a vertical position where it may receive a reactor component to a horizontal position where it is aligned with said tube means, said horizontal axis being located substantially midway between the ends of the cylindrical element, conduit means aligned with said tube means and positioned at the end of said first cylindrical element opposite said tube means when the cylindrical element is in a horizontal position, means for hydraulically sealing the opposite ends of the cylindrical element to the tube means and conduit means respectively, and means for forcing liquid under pressure into said conduit means to thereby move a reactor component deposited in the cylindrical element through the tube means between said plant enclosure and said fuel pit.

9. In apparatus for handling and transporting neutronic reactor components, a plant enclosure capable of holding a shielding liquid, an external spent fuel pit also capable of holding a shielding liquid, tube means for connecting the spent fuel pit and plant enclosure at the lower portions thereof, a first cylindrical element in the plant enclosure beneath the surface of said shielding liquid when contained therein and rotatable about a generally horizontal axis from a vertical position where it may receive a reactor component to a horizontal position where it is aligned with said tube means, first conduit means aligned with said tube means in the plant enclosure and positioned at the end of said first cylindrical element opposite said tube means when the cylindrical element is in a horizontal position, a second cylindrical element in the spent fuel pit beneath the surface of the shielding liquid when contained therein and rotatable about a generally horizontal axis from a vertical position where a reactor component may be removed therefrom to a horizontal position where it is aligned with said tube means at the end thereof opposite said first cylindrical element, second conduit means aligned with said tube means and positioned at the end of said second cylindrical element in the spent fuel pit opposite said tube means when the second cylindrical element is in a horizontal position within the spent fuel pit, means for hydraulically sealing the opposite ends of the respective first and second cylindrical elements to the tube means and their associated conduit means, and means for forcing liquid under pressure into said first conduit means while withdrawing liquid from the second conduit means to thereby move a reactor component deposited in the first cylindrical element through the tube means to the second cylindrical element.

10. The combination of claim 9 including a conduit for connecting said first conduit means to said spent fuel pit at the lower portion thereof, a storage tank, and a conduit connecting said second conduit means to the storage tank whereby the static pressure head within the spent fuel pit may be utilized to force the reactor component through the tube means with the liquid within the tube means being discharged into said storage tank.

11. In appartus for for handling and transporting neutronic reactor components, a plant enclosure capable of holding a shielding liquid, an external spent fuel pit also capable of holding a shielding liquid, tube means for connecting the spent fuel pit and plant enclosure at the lower portions thereof, a first cylindrical element in the plant enclosure beneath the surface of said shielding liquid when contained therein and rotatable about a generally horizontal axis from a substantially vertical position to a substantially horizontal position where it is aligned with said tube means, a second cylindrical element in the spent fuel pit beneath the shielding liquid when contained therein also rotatable about a generally horizontal axis from a substantially vertical position to a substantially horizontal position where it is aligned with the tube means, a carriage reciprocable in said tube means between the first and second cylindrical elements at opposite ends thereof, said carriage comprising an elongated receptacle for a reactor component, roller means on the bottom of said receptacle for guiding the carriage longitudinally along the tube means, a rail device extending throughout the tube means, additional roller means on the carriage capable of engaging said rail device to guide the carriage laterally throughout the tube means, and means for hydraulically forcing said carriage through the tube means between said first and second cylindrical elements.

12. The apparatus of claim 11 wherein a locking device is provided on each of said cylindrical elements for locking the carriage thereto when it is rotated from a substantially horizontal to a substantially vertical position.

13. The apparatus of claim 11 wherein a tubular sleeve surrounds at least one end of each of said cylindrical elements, and including means on each cylindrical element for sliding said sleeve element into a retracted position where the cylindrical element may be rotated into alignment with the tube means or into an extended position where it slides over the end of said tube means to provide a hydraulic seal between the cylindrical element and its associated tube means.

14. In apparatus for handling and transporting neutronic reactor components, a plant enclosure capable of holding a shielding liquid, an external spent fuel pit also capable of holding a shielding liquid, tube means for connecting the spent fuel pit and plant enclosure at the lower portions thereof, a first cylindrical element in the plant enclosure rotatable about a generally horizontal axis from a substantially vertical position to a substantially horizontal position where it is aligned with said tube means, a second cylindrical element in the spent fuel pit also rotatable about a generally horizontal axis from a substantially vertical position to a substantially horizontal position where it is aligned with the tube means, a carriage reciprocable in said tube means between the first and second cylindrical elements at opposite ends thereof, said carriage comprising an elongated receptacle for a reactor component, roller means on the bottom of said receptacle for guiding the carriage longitudinally along the tube means and the first and second cylindrical elements, a rail device extending throughout the tube means, another rail device in each of said first and second cylindrical elements, additional roller means on the carriage capable of engaging said rail devices to guide the carriage laterally throughout the tube means and the first and second cylindrical elements, and means for hydraulically forcing said carriage through the tube means between said first and second cylindrical elements.

15. Apparatus for transporting a component comprising a compartment capable of holding a liquid, another compartment capable of holding a liquid, a liquid in at least one of said compartments, open passage means extending between said compartments and communicable therewith, said passage means disposed generally below the level of said liquid, a carrier capable of receiving said component and disposed for reciprocating movement within said passage means and between said compartments, means for aligning said carrier with said passage means, and means for applying the force of the static pressure head of said liquid to one end of said carriage while maintaining the space adjacent the other end of said carriage at a lower pressure than the static pressure head whereby said carrier is hydraulically forced between said compartments.

References Cited by the Examiner
UNITED STATES PATENTS

| | | | |
|---|---|---|---|
| 2,803,601 | 8/1957 | Cooper | 176—32 |
| 2,870,075 | 1/1959 | Leverett | 176—32 |
| 2,875,345 | 2/1959 | Nicoll. | |
| 2,940,915 | 6/1960 | Hammond | 176—32 |
| 3,128,963 | 4/1964 | Erkes | 243—1 |
| 3,165,594 | 1/1965 | Wooten | 302—14 |

ANDRES H. NIELSEN, *Primary Examiner.*